United States Patent
Wollensak et al.

[15] 3,683,054
[45] Aug. 8, 1972

[54] S[-3,5(OR 6)-DIHYDROCARBYL-4-HYDROXY-PHENYL] PHOSPHATES OR PHOSPHITES

[72] Inventors: John C. Wollensak, Royal Oak, Mich. 48072; Edward F. Zaweski, Pleasant Ridge, Mich. 48069

[73] Assignee: Ethyl Corporation, New York, N.Y.

[22] Filed: Nov. 29, 1968

[21] Appl. No.: 780,266

Related U.S. Application Data

[63] Continuation-in-part of Ser. No. 746,760, July 23, 1968, abandoned.

[52] U.S. Cl. .................260/953, 44/76, 44/DIG. 4, 252/46.6, 252/400, 260/45.95, 260/398.5, 260/814, 260/973, 208/20
[51] Int. Cl. .....................C07f 9/18, B01j 1/16
[58] Field of Search........................260/953

[56] References Cited

UNITED STATES PATENTS

| | | |
|---|---|---|
| 3,061,586 | 10/1962 | Thompson..............260/953 X |
| 3,336,421 | 8/1967 | McConnell................260/953 |
| 3,467,735 | 9/1969 | Hunter......................260/953 |
| 3,467,737 | 9/1969 | Brindell....................260/953 |

FOREIGN PATENTS OR APPLICATIONS

| | | |
|---|---|---|
| 1,496,562 | 9/1967 | France...................260/953 X |
| 1,496,564 | 9/1967 | France...................260/953 X |

*Primary Examiner*—Joseph Rebold
*Assistant Examiner*—Anton H. Sutto
*Attorney*—Donald L. Johnson

[57] ABSTRACT

Organic material, especially polypropylene, is stabilized by the additon of mono- or di- (dihydrocarbylhydroxyphenyl) alkyl phosphates, phosphites, thiophosphates or thiophosphites, such as 3,5-di-tert-butyl-4-hydroxyphenyl di-n-octadecyl phosphate. Effectiveness is synergistically improved by inclusion of a dialkyl thiodialkanoate such as dilaurylthiodipropionate.

12 Claims, No Drawings

S[-3,5(OR 6)-DIHYDROCARBYL-4-HYDROXY-PHENYL] PHOSPHATES OR PHOSPHITES

This application is a Continuation-in-Part of application Ser. No. 746,760, filed July 23, 1968, now abandoned.

BACKGROUND

It is a common practice to include an antioxidant in organic materials normally susceptible to oxidative degradation. Many of the antioxidants employed have limited effectiveness or tend to impart undesirable properties to the organic material such as causing a change in color. The problem is particularly acute with polymers and copolymers of ethylenically unsaturated monomers, especially polyolefins such as polypropylene. These materials are subjected to elevated temperatures during processing, with tends to destroy many antioxidants with the result that the polymer rapidly degenerates during use.

SUMMARY

This invention relates to new organic compositions that are resistant to degradation due to the effect of oxygen. In particular, this invention relates to new antioxidant compounds and their use alone or in combination with a synergist.

PREFERRED EMBODIMENTS

An object of this invention is to provide new compounds which will prolong the life of organic material normally subject to degradation in the presence of oxygen. This and other objects are attained by providing a new antioxidant compound having the formula:

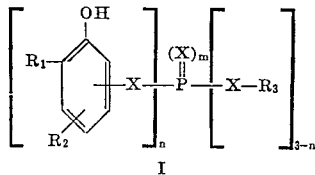

I wherein $m$ is an integer selected from 0 and 1, $n$ is an integer selected from 1 and 2, $R_1$ is selected from the group consisting of alpha-branched alkyl radicals containing 3–20 carbon atoms, alpha-branched aralkyl radicals containing 8–20 carbon atoms and cycloalkyl radicals containing 6–20 carbon atoms, $R_2$ is selected from the group consisting of alkyl radicals containing 1–20 carbon atoms, aralkyl radicals containing 7–20 carbon atoms and cycloalkyl radials containing 6–20 carbon atoms, $R_3$ is an alkyl radical containing 1–50 carbon atoms, and X is independently selected from oxygen and sulfur.

Some examples of these compounds are:

3-tert-butyl-5-methyl-2-hydroxyphenyl dimethyl phosphate

S-(3,5-diisopropyl-4-hydroxyphenyl) O,O-di-n-dodecyl thiolothionophosphate

O-(3-sec-butyl-5-methyl-2-hydroxyphenyl O,O-di-n-octadecyl thionophosphate 3-tert-octyl-6-methyl-2-hydroxyphenyl di-sec-eicosyl tetrathiophosphate di-(3-sec-eicosyl-5-ethyl-2-hydroxyphenyl) docosyl phosphate di-[3-(α-methylbenzyl)-5-methyl-2-hydroxyphenyl] triacontyl thionophosphate 3,5-di-(α,α-dimethylbenzyl)-2-hydroxyphenyl di-tetracontyl trithiolophosphate 3-(α-methyl-2,3-benzobenzyl)-5-sec-eicosyl-2-hydroxyphenyl di-pentacontyl phosphate di-(3,5-dicyclohexyl-2-hydroxyphenyl dotriacontyl phosphite 3,5-di-(α-methyl-4-sec-dodecylbenzyl)-2-hydroxyphenyl diisobutyl phosphite di-[3-(4-sec-tetradecylcyclohexyl)-5-tert-butyl-2-hydroxyphenyl] n-dodecyl phosphite 3-methyl-5-tert-butyl-4-hydroxyphenyl diisopropyl phosphate di-(3,5-di-tert-amyl-4-hydroxyphenyl) 2-ethylhexyl thionophosphate S-(3,5-di-sec-octyl-4-hydroxyphenyl) O,O-di-n-octadecyl thiolothionophosphate 3-methyl-5-sec-eicosyl-4-hydroxyphenyl di-n-eicosyl thionophosphate di-[3-tert-butyl-5-(α-methylbenzyl)-4-hydroxyphenyl] docosyl phosphate 3-isopropyl-5-(α-methyl-2,3-benzobenzyl)-4-hydroxyphenyl di-tetracontyl phosphate 3,5-di-(α-methyl-4-sec-dodecylbenzyl)-4-hydroxyphenyl di-n-cetyl thionophosphate 3-methyl-5-(1-methylcyclohexyl)-4-hydroxyphenyl ditetracontyl phosphate 2-methyl-5-tert-butyl-4-hydroxyphenyl di-n-octadecyl phosphate 2-methyl-5-tert-amyl-4-hydroxyphenyl di-n-octadecyl phosphite 2-methyl-5-(α,α-dimethylbenzyl)-4-hydroxyphenyl di-docosyl thionophosphate 2-ethyl-5-cyclooctyl-4-hydroxyphenyl diisobutyl phosphite S-[2-isopropyl-5-(4-sec-tetradecylcyclohexyl)-4-hydroxyphenyl] O,O-di-triacontyl thiolophosphate 3,5-di-tert-butyl-4-hydroxyphenyl di-n-dodecyl trithiophosphite 3,5-di-tert-butyl-4-hydroxyphenyl di-n-octadecyl phosphite 2-methyl-5-(α-methylbenzyl-4-hydroxyphenyl) di-n-hexadecyl phosphite di-(3,5-dicyclohexyl-4-hydroxyphenyl) methyl phosphite The above class of compounds, in which $R_3$ is an alkyl radical having 12–50 carbon atoms, is preferred. This class is apparently more compatible with a broader range of organic material. More preferred antioxidants are those in which the phenolic hydroxy radical is in the 4 position. These preferred compounds have the formula:

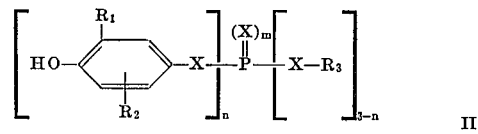

II in which $m$, $n$, $R_1$, $R_2$, $R_3$ and X are the same as in Formula I.

Representative examples of this class of antioxidants are:

2-methyl-5-tert-butyl-4-hydroxyphenyl dimethyl phosphate 2,5-di-tert-butyl-4-hydroxyphenyl diisobutyl phosphate 2-methyl-5-cyclohexyl-4-hydroxyphenyl S,S-di-n-dodecyl dithiolothionophosphate 3-methyl-5-sec-eicosyl-4-hydroxyphenyl di-sec-hexadecyl tri-thiolophosphate 3-isopropyl-5-(4-sec-tetradecylcyclohexyl)-4-hydroxyphenyl di-n-decyl phosphite S-[2-methyl-5-(α-methylbenzyl)-4-hydroxyphenyl] O,O-di-n-octadecyl thiolophosphate di-[3-methyl-5-(α,α-dimethylbenzyl)-4-hydroxyphenyl] pentacontyl thionophosphate Highly preferred additives have the formula:

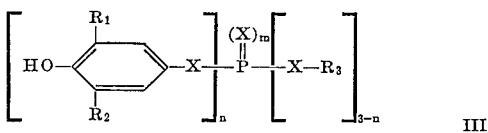

wherein $m$, $n$, $R_1$, $R_2$, $R_3$ and $X$ are the same as defined for Formula I.

Some examples of this highly preferred class of compounds are:

di-(3,5-di-tert-amyl-4-hydroxyphenyl) methyl phosphite di-(3-methyl-5-isopropyl-4-hydroxyphenyl) isobutyl phosphite 3,5-di-sec-eicosyl-4-hydroxyphenyl di-n-dodecyl phosphite 3,5-dicyclohexyl-4-hydroxyphenyl di-n-hexadecyl phosphate 3,5-di-(α-methyl-4-sec-dodecylbenzyl)4-hydroxyphenyl di-tetracontyl phosphite 3,5-di-(4-tert-tetradecylcyclohexyl)-4-hydroxyphenyl dieicosyl phosphate 3,5-di-(α-methylbenzyl)-4-hydroxyphenyl di-triacontyl phosphate di-[3,5-di-(α,α-dimethylbenzyl)-4-hydroxyphenyl] tetracontyl phosphate di-[3-methyl-5-(α-methyl-2,3-benzobenyl)-4-hydroxyphenyl] pentacontyl phosphate di-(3,5-sec-butyl-4-hydroxyphenyl) ethyl thionophosphate S-(3,5-di-sec-eicosyl-4-hydroxyphenyl) O,O-di-n-hexacosyl thiolophosphate 3,5-di-(α-methylbenzyl)-4-hydroxyphenyl S,S-di-n-octadecyl dithiolophosphate di-(3,5-di-tert-octyl-4-hydroxyphenyl) S-tetracosyl thiolothionophosphate 3,5-dicyclooctyl-4-hydroxyphenyl S,S-di-2-ethylhexyl dithiolothionophosphate S-(3,5-di-sec-octadecyl-4-hydroxyphenyl) O,O-diisopropyl thiophosphite 3,5-di-(4-tetradecylcyclohexyl)-4-hydroxyphenyl S,S-di-2-ethyloctyl dithiophosphite A most preferred embodiment is represented by the phosphates, especially those in which both positions ortho to the phenolic hydroxyl radical are tert-butyl groups. This class of compounds his the formula:

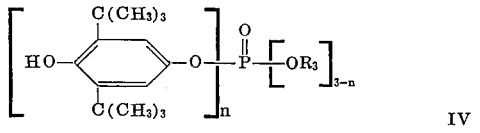

wherein $n$ and $R_3$ are the same as defined in Formula I.

Examples of these compounds are:

3,5-di-tert-butyl-4-hydroxyphenyl dimethyl phosphate 3,5-di-tert-butyl-4-hydroxyphenyl diisobutyl phosphate 3,5-di-tert-butyl-4-hydroxyphenyl di-(2-ethylhexyl) phosphate 3,5-di-tert-butyl-4-hydroxyphenyl di-n-dodecyl phosphate 3,5di-tert-butyl-4-hydroxyphenyl di-sec-eicosyl phosphate 3,5-di-tert-butyl-4-hydroxyphenyl di-triacontyl phosphate 3,5-di-tert-butyl-4-hydroxyphenyl di-tetracontyl phosphate 3,5-di-tert-butyl-4-hydroxyphenyl di-pentacontyl phosphate di-(3,5-di-tert-butyl-4-hydroxyphenyl) methyl phosphate di-(3,5-di-tert-butyl-4-hydroxyphenyl) isobutyl phosphate di-(3,5-di-tert-butyl-4-hydroxyphenyl) 2-ethylhexyl phosphate di-(3,5-di-tert-butyl-4-hydroxyphenyl) n-dodecyl phosphate di-(3,5-di-tert-butyl-4-hydroxyphenyl) sec-eicosyl phosphate di-(3,5-di-tert-butyl-4-hydroxyphenyl) triacontyl phosphate di-(3,5-di-tert-butyl-4-hydroxyphenyl) tetracontyl phosphate di-(3,5-di-tert-butyl-4-hydroxyphenyl) pentacontyl phosphate Unusually good antioxidant protection is obtained at low cost when $R_3$ in Formula IV is an aliphatic hydrocarbon radical containing from 20–50 carbon atoms in proportion such that from 15–20 per cent of the radicals have 20 carbon atoms, from 10–30 per cent of the radicals have 22 carbon atoms, from 5–20 per cent of the radicals have 24 carbon atoms, from 5–20 per cent of the radicals have 26 carbon atoms, from 5–20 per cent of the radicals have 28 carbon atoms, and from about 5–20 per cent of the radicals have an even number of carbon atoms from 30–50. This mixture of aliphatic hydrocarbon radicals is readily obtained by preparing the compounds using a corresponding mixture of alcohols, as will be later described. These alcohol mixtures are available from a Ziegler type aluminum alkyl chain growth alcohol process. In this process, an aluminum alkyl such as triethyl aluminum is reacted with an olefin such as ethylene under pressure to cause the alkali alkyl radicals bonded to aluminum to grow in two carbon units until a random distribution of radicals is obtained. These are converted to a corresponding mixture of alcohols by controlled oxidation. Removal of the lower alcohols containing up to about 18 carbon atoms leaves a mixture eminently useful in making the additives of the present invention.

The most preferred embodiments of this invention are the additives di-(3,5-tert-butyl-4-hydroxyphenyl) n-octadecyl phosphate and 3,5-di-tert-butyl-4-hydroxyphenyl di-n-octadecyl phosphate.

The additives of this invention are readily prepared by reacting the appropriate hydroquinone or mercaptophenol with the appropriate phosphorous trihalide, phosphorus oxyhalide or phosphorus thiohalide and then reacting the intermediate product with the appropriate alcohol or alkyl mercaptan. The reaction is preferably carried out in a solvent such as toluene or xylene and in the presence of a hydrogen halide acceptor such as the tertiary amines, for example, pyridine or triethyl amine. The following examples serve to illustrate the methods of preparing the antioxidants described herein. All parts are parts by weight unless otherwise specified.

EXAMPLE 1

In a reaction vessel equipped with stirrer, condenser, thermometer, heating means and provided with a nitrogen atmosphere was placed 129 parts of toluene and 38.8 parts of phosphorus oxychloride. To this solution was added a solution of 50.6 parts of triethylamine, 20 parts of toluene and 111.3 parts of 2,6-di-tert-butyl hydroquinone. The temperature rose from 10° to 40° C. during this addition. The mixture was stirred at room temperature for 2 days. The mixture was then filtered to remove the triethylamine hydrochloride. One-half of the filtrate was placed in a second reaction vessel and 13.1 parts of triethylamine added. Then a solution of 33.8 parts of 1-octadecanol in 175 parts of toluene was added. The mixture was stirred and heated to 55° C. and stirred at this temperature for 23 hours. The mixture was cooled and filtered. The filtrate was washed with water and the solvent distilled out, leaving 88 parts of residue. This was identified by elemental analysis and nuclear magnetic resonance as bis-(3,5-di-tert-butyl-4-hydroxyphenyl)-n-octadecyl phosphate.

EXAMPLE 2

In the reaction vessel of Example 1 was placed 69 parts of phosphorus oxychloride, 86 parts of toluene and 15.1 parts of triethylamine. A solution of 33.3 parts of 2,6-di-tert-butyl hydroquinone in 129 parts of toluene was added and the mixture stirred for 30 minutes at 30°–50° C. Solids precipitated and were filtered off at room temperature. The toluene was distilled out under vacuum, leaving 3,5-di-tert-butyl-4-hydroxyphenyl dichlorophosphate. In a second reaction vessel was placed 17 parts of the dichlorophosphate intermediate, 129 parts of toluene and 27 parts of n-octadecanol. Following this, 11.1 parts of triethylamine were added and the mixture stirred and heated to 80° C. It was stirred at this temperature for 8 hours and then heated to reflux for 4 hours. It was cooled to room temperature, filtered, and the filtrate washed with water. Toluene was then distilled out under vacuum, leaving as the product 3,5-di-tert-butyl-4-hydroxyphenyl di-n-octadecyl phosphate.

EXAMPLE 3

In the reaction vessel of Example 1 place 137.5 parts of phosphorus trichloride and 200 parts of xylene. Slowly add a solution of 105 parts of triethylamine in 100 parts of xylene followed by 222 parts of 2,6-di-tert-butyl hydroquinone dissolved in 200 parts of xylene. Stir at 50°–70° C. for 4 hours and then cool and filter. Add a solution of 210 parts of triethylamine in 200 parts of xylene to the filtrate and then add 300 parts of 1-eicosyl alcohol. Stir and heat to reflux and hold at reflux for 4 hours. Cool to 10° C. and filter. Wash the filtrate with water and then distill off the xylene under vacuum at 0.2 mm. Hg. up to a liquid temperature of 150° C., leaving as the product 3,5-di-tert-butyl-4-hydroxyphenyl dieicosyl phosphite.

Other phosphites or phosphates of this invention are readily prepared following the above general procedure but using other hydroquinones, mercaptophenols, alcohols or alkyl mercaptans. The following tables list the reactants and the products which will result. In the first table the phosphorus halide reactant is phosphorus oxychloride.

TABLE 1

| Reactants | | |
|---|---|---|
| Hydroquinone or Mercaptophenol | Alcohol or Alkylthiol | Product |
| 2-tert-butyl-5-methyl hydroquinone | isobutanol | 2-methyl-5-tert-butyl-4-hydroxyphenyl di-isobutyl phosphate |
| 2-methyl-4-mercapto-6-(α,α-dimethylbenzyl) phenol | n-octa-decanol | S-[3-(α, α-dimethylbenzyl) 5-methyl-4-hydroxyphenyl] O,O-di-n-octadecyl thiolophosphate |
| 2,6-di-tert-butyl-hydroquinone | octadecyl mercaptan | 3,5-di-tert-butyl-4-hydroxyphenyl S,S-di-octadecyl dithiolo-phosphate |
| 2,6-dicyclohexyl-4-mercaptophenol | dodecyl mercaptan | 3,5-dicyclohexyl-4-hydroxyphenyl di-dodecyl trithiolophosphate |

In the following table the phosphorus halide reactant is phosphorus thiochloride.

TABLE 2

| Reactants | | |
|---|---|---|
| Hydroquinone or Mercaptophenol | Alcohol or Alkylthiol | Product |
| 2,6-dicyclohexyl hydroquinone | tetracosyl alcohol | 3,5-dicyclohexyl-4-hydroxyphenyl di-tetracosyl thiono-phosphate |
| 2-methyl-6-tert-butyl-4-mercapto-phenol | isobutyl mercaptan | 3-methyl-5-tert-butyl-4-hydroxyphenyl di-isobutyl tetrathio-phosphate |
| 2,6-di-sec-eicosyl hydroquinone | n-dodecyl mercaptan | 3,5-di-sec-eicosyl-4-hydroxyphenyl S,S-di-n-dodecyl dithiolo-thionophosphate |

In the following table the phosphorus halide reactant is phosphorus trichloride.

TABLE 3

| Reactants | | |
|---|---|---|
| Hydroquinone or Mercaptophenol | Alcohol or Alkylthiol | Product |
| 2,6-di-tert-butyl-4-mercaptophenol | n-eicosyl mercaptan | 3,5-di-tert-butyl-4-hydroxyphenyl di-n-eicosyl trithiophosphite |
| 2,6-di(α-methylbenzyl) 4-mercaptophenol | triacontyl alcohol | S-[3,5(α-methylbenzyl)-4-hydroxyphenyl] O,O-di-triacontyl thio-phosphite |
| 2-(α,α-dimethyl-benzyl)-5-methyl hydroquinone | do-triacontyl mercaptan | O-[2-methyl-5(α,α-dimethylbenzyl)-4-hydroxyphenyl] S,S-di-dotriacontyl dithiophosphite |
| 2-(α,α-dimethyl-4-sec-decylbenzyl)-4-mercapto-5-methyl phenyl | pentacontyl alcohol | S-[2-methyl-5-(α,α-dimethyl-4-sec-decylphenl)-4-hydroxyphenyl] O,O-dipentacontyl thio-phosphite |
| 2,6-di(4-sec-tetradecyl cyclohexyl hydroquinone | hexadecyl mercaptan | 3,5-di(4-sec-tetradecylcyclohexyl)-4-hydroxyphenyl S,S-di-hexadecyl dithiophosphite |

In the examples shown in the above tables two moles of the alcohol or alkyl mercaptan were employed for each mole of phenolic reactant. This can be reversed such that about 2 moles of the phenolic reactant are employed for each mole of alcohol or alkyl mercaptan reactant with the result that the product will be of the class previously described having 2 phenolic substituents and one alkyl ester substituent.

As previously stated, a most preferred embodiment of this invention is the class of compounds made using a mixture of aliphatic alcohols obtained from a Ziegler type aluminum alkyl chain growth alcohol process. The following example illustrates the preparation of the additives using such an alcohol mixture.

EXAMPLE 4

In the reaction vessel of Example 1 place 153.5 parts of phosphorus oxychloride, 200 parts of toluene and 101 parts of triethylamine. Slowly add a solution of 222 parts of 2,6-di-tert-butyl hydroquinone in 300 parts of toluene over a one hour period at 30°–35° C. While stirring, heat to 50° C. and stir for one hour. Cool to 15° C. and filter. To the filtrate add 202 parts of triethylamine and 975 parts of a mixture of:

1 weight per cent octadecyl alcohol
18 weight per cent eicosyl alcohol
12 weight per cent docosyl alcohol
10 weight per cent tetracosyl alcohol
9 weight per cent hexacosyl alcohol
8 weight per cent octacosyl alcohol
7 weight per cent triacontyl alcohol
10 weight per cent $C_{32-50}$ alcohols
25 weight per cent paraffinic hydrocarbons The above alcohol mixture is predominantly primary and contains both straight and branched chain alcohols. Heat the mixture to 75°C. and stir for 8 hours at this temperature. Heat to reflux for one hour and then cool to room temperature. Filter and wash the filtrate with water. Distill out the volatiles at 0.2 mm. Hg. up to a liquid temperature of 150°C. The residue is principally 3,5-di-tert-butyl-4-hydroxyphenyl di($C_{20-50}$ alkyl)phosphate.

The compounds that have been described are useful in stabilizing organic material normally subject to oxidative degradation. When used for this purpose they are usually present in amounts from 0.001 to 5 weight per cent. Although the preferred amount will vary with the organic material being stabilized and the degree of stability desired, in most cases adequate protection is obtained when from about 0.1 to 3 per cent of the additive compound is included in the organic material.

The present antioxidants can be used in a wide range of organic materials. Some examples of these are liquid hydrocarbon fuels such as gasoline, kerosene and fuel oil. Likewise, liquid hydrocarbon fuels such as gasoline which contain organometallic additives such as tetrathyllead as well as other organometallic compounds which are used as fuel additives attain appreciably increased oxidative stability by the practice of this invention. In addition, lubricant oils and functional fluids, both those derived from naturally occurring hydrocarbons and those synthetically prepared are greatly enhanced by the practice of this invention. The addition of small quantities of the compounds of this invention to such materials as turbine, hydraulic, transformer and other highly refined industrial oils, soaps and greases; plastics; synthetic polymers such as polyethylene and polypropylene; organometallic compositions where such fluids contain tetraethyllead and tetraethyllead antiknock mixtures as well as other organometallics; elastomers, including natural rubber; lubricating greases; crankcase lubricating oils; and the like, greatly increase resistance to deterioration in the presence of air, oxygen or ozone.

The compounds of this invention are also very useful in protecting petroleum wax — paraffin wax and microcrystalline wax — against oxidative deterioration. They also find use in the stabilization of edible fats and oils of animal and vegetable origin which tend to become rancid, especially during long periods of storage because of oxidative deterioration. Typical representatives of these edible fats and oils are linseed oil, cod liver oil, castor oil, soy bean oil, rape seed oil, coconut oil, olive oil, palm oil, corn oil, sesame oil, peanut oil, babassu oil, butter fat, lard, beef tallow, and the like.

The compounds of this invention are also useful in preventing oxidative deterioration in lubricating oil compositions. The following examples illustrate the preferred lubricating oil compositions of this invention.

EXAMPLE 5

To 1,000 parts of a solvent-refined neutral oil 95 V.I. and 200 SUS at 100° F., containing 6 per cent of a commercial methacrylate Type VI improver which gives the finished formulation of a V.I. of 140 and a viscosity of 300 SUS at 100° F., is added 5 per cent of 3-tert-butyl-5-methyl-2-hydroxyphenyl dimethyl phosphate.

EXAMPLE 6

To an additive-free solvent-refined crankcase lubricating oil having a viscosity index of 95 and an SAE viscosity of 10 is added 0.001 per cent of S-(3,5-diisopropyl-4-hydroxyphenyl) O,O-di-n-dodecyl thiolothionophosphate.

EXAMPLE 7

To 100,000 parts of a petroleum hydrocarbon oil having a gravity of 30.3° API at 60° F., a viscosity of 178.8 SUS at 100° F., a viscosity index of 154.2 and which contains 0.2 per cent sulfur, is added 200 parts of O-(3-sec-butyl-5-methyl-2-hydroxyphenyl) O,O-di-n-octadecyl thionophosphate. The resulting oil possesses greatly enhanced resistance to oxidative deterioration.

EXAMPLE 8

To 100,000 parts of a commercially available pentaerythritol ester of a mixture of $C_{5-7}$ aliphatic monocarboxylic acids is added 400 parts (0.4 per cent) of 3-tert-octyl-6-methyl-2-hydroxyphenyl di-sec-eicosyl tetrathiophosphate. The resulting finished oil possesses markedly improved resistance against oxidative deterioration.

EXAMPLE 9

To 100,000 parts of dioctyl sebacate having a viscosity at 210° F. of 36.7 SUS, a viscosity index of 159 and a molecular weight of 426.7 is added 250 parts (0.25 per cent) of di-(3-sec-eicosyl-5-ethyl-2-hydroxyphenyl) docosyl phosphate.

The compounds of this invention are also useful as additives to functional fluids and automatic transmission fluids. The primary constituent of a functional fluid is a refined mineral lubricating oil having a carefully selected minimum viscosity of 49 Saybolt Universal Seconds (SUS) at 210° F. and a maximum viscosity of 7,000 SUS at 0° F., generally a distillate oil, lighter than an SAE 10 motor oil. The oil usually amounts to between about 73.5 to about 97.5 per cent by weight of the finished fluid. Preferably, the base oil is selected from a paraffin base distillate such as a Pennsylvania crude.

The fluids usually contain compounds which are characterized by containing one or more organic components which may be alky, aryl, alkaryl or aralkyl groups that are bonded to one or more metal atoms through coupling groups such as sulfonate, hydroxyl, carboxyl and mercaptan. The metal atoms may be aluminum, calcium, lithium, barium, strontium and magnesium. The organic components contain oil-solubilizing groups such as high molecular weight straight or branched chain paraffins, aromatic or naphthenic rings, or contain a halogen. These metal compounds are present in the compounded fluid in a concentration range of between about 0.1 to about 5 per cent by weight. These compounds include alkaline-earth metal salts or phenyl-substituted long chain fatty acids, alkaline-earth metal salts of the capryl or octyl esters of salicylic acid, the alkaline-earth metal salts of petroleum sulfonic acids, the alkaline-earth metal salts of alkyl-substituted phenol sulfides, the salt of aluminum or the alkaline-earth metals with cetyl phenol, and the metal salts of wax-substituted phenol derivatives. Another class of additives are the so-called overbased phenates and sulfonates, which can be prepared by reaction between an alkyl phenol or alkyl phenyl sulfonate and an excess of an alkaline-earth metal oxide or hydroxide at an elevated temperature in an alcohol such as methanol followed by treatment with carbon dioxide. The over-based phenate or sulfonate formed from the reaction contains up to two or three times as much metal as the normal phenate or sulfonate.

In addition, functional fluids may contain additional components which improve the properties of the fluid. Typical components include anti-squawk additives, pour point depressants, foam inhibitors, rust preventatives, extreme pressure agents, metal deactivators and viscosity index improvers.

The following examples show typical functional fluids of this invention. The fluids are formed by mixing the ingredients together, while heating the oil to a temperature up to 200° F.

EXAMPLE 10

A fluid of this invention is prepared by blending 80 parts of a conventionally-refined Pennsylvania mineral oil (99 SUS at 100° F.), 2 parts of di-[3-($\alpha$-methylbenzyl)-5-methyl-2-hydroxyphenyl] triacontyl thionophosphate, 5 parts of barium petroleum sulfonate, 10 parts of a polyacrylate having a molecular weight of approximately 7,000 derived from a fatty alcohol such as cetyl or lauryl alcohol, 0.1 part of a dimethyl silicone polymer antifoam agent, 2 parts of a dialkyl zinc dithiophosphate and 0.9 part of a dark, viscous liquid having a viscosity of 560 SUS at 210° F., a flash point of 420° F., a pour point of 30° F., and a specific gravity of 60°/60° F. of 0.919.

EXAMPLE 11

Another such fluid consists of 95 parts of a solvent-refined, light acid-treated, clay-contacted, solvent-dewaxed paraffin base distillate mineral oil (110 SUS at 100° F.); 0.1 part of 3,5-di-($\alpha,\alpha$-dimethylbenzyl)-2-hydroxyphenyl di-tetracontyl trithiolophosphate, 0.1 part of calcium octylphenyl sulfonate; 2 parts of a sulfurized sperm oil having a sulfur content between 10–12 per cent, a viscosity at 210° F. of 200 SUS and a pour point of 65° F., 0.3 part of an ester of an aromatic acid and wax-alkylated phenol having a molecular weight of approximately 450, 2.5 parts of a linear pale color isobutylene polymer of a controlled molecular weight having a viscosity of 3,000 SUS at 210° F., a specific gravity of 60°/60° F. of 0.875.

Liquid hydrocarbon fuels employed in the operation of spark ignition combustion engines are also vastly improved in their storage stability by the practice of this invention. Table 4 below gives the compositions of a number of typical commercial gasolines which may be stabilized against oxidative deterioration by the inclusion therein of a compound of this invention.

TABLE 4

GASOLINE COMPOSITIONS

| Gasoline | Percent Aromatics | Percent Olefins | Percent Saturates | Gravity °API |
|---|---|---|---|---|
| A | 26.6 | 20.8 | 52.6 | 62.1 |
| B | 8.6 | 7.9 | 83.5 | 68.5 |
| C | 20.0 | 41.2 | 38.8 | 62.9 |
| D | 40.5 | 12.9 | 46.6 | 63.5 |
| E | 38.1 | 7.3 | 54.6 | 59.3 |

EXAMPLE 12

To 1,000 parts of Gasoline A, as described in Table 4, is added 10 parts of 3-($\alpha$-methyl-2,3-benzobenzyl)-5-sec-eicosyl-2-hydroxyphenyl di-pentacontyl phosphate.

To 10,000 parts of Gasoline B is added 50 parts of di-(3,5-dicyclohexyl-2-hydroxyphenyl dotriacontyl phosphite.

EXAMPLE 14

To 500 parts of Gasoline C, as described in Table 4, is added 10 parts of 3,5-di-($\alpha$-methyl-4-sec-dodecylbenzyl)-2-hydroxyphenyl diisobutyl phosphite.

EXAMPLE 15

To 2,000 parts of Gasoline D is added 15 parts of di-[3-(4-sec-tetradecylcyclohexyl)-5-tert-butyl-2-hydroxyphenyl] n-dodecyl phosphite.

EXAMPLE 16

To 10,000 parts of Gasoline E is added 500 parts of 3-methyl-5-tert-butyl-4-hydroxyphenyl diisopropyl phosphate.

Antiknock compositions and spark ignition internal combustion engine fuels containing mixtures of organolead antiknock agents and cyclopentadienyl manganese tricarbonyls are also vastly improved in their storage stability by the practice of this invention. Such compositions are described more fully in U.S. Pat. No.

2,818,417. The following examples illustrate these compositions of this invention and the methods by which they are prepared.

EXAMPLE 17

To 1,000 gallons of a commercial gasoline having a gravity of 59.0° API, an initial boiling point of 98° F. and a final boiling point of 390° F. are added 3.18 grams per gallon of lead as tetraethyllead, 0.6 theory (based on the lead) of bromine as ethylene dibromide, 1.0 theory (based on the lead) of chlorine as ethylene dichloride, 0.25 gram of manganese per gallon as methylcyclopentadienyl manganese tricarbonyl and 0.0002 weight per cent (based on the gasoline) of di-(3,5-di-tert-amyl-4-hydroxyphenyl) 2-ethylhexyl thionophosphate. The resultant fuel possesses enhanced stability characteristics.

EXAMPLE 18

With a gasoline having an initial boiling point of 93°F., a final boiling point of 378° F., an API gravity of 56.2° and a tetraethyllead content equivalent to 0.2 gram of lead per gallon are blended cyclopentadienyl nickel nitrosyl to a concentration of 0.05 gram of nickel per gallon and S-(3,5-di-sec-octyl-4-hydroxyphenyl) O,O-di-n-octadecyl thiolothionophosphate to a concentration of 0.005 weight per cent (based on the gasoline). The finished fuel so formed possesses improved stability properties.

EXAMPLE 19

To a gasoline having an API gravity of 51.5°, an initial boiling point of 91° F. and a final boiling point of 394° F. are blended 6.4 grams of lead per gallon as tetrabutyllead, 2 grams of manganese per gallon as octylcyclopentadienyl manganese tri-carbonyl and 0.0008 weight per cent (based on the gasoline) of 3-methyl-5-sec-eicosyl-4-hydroxyphenyl di-n-eicosyl thionophosphate. The resultant fuel possesses very good stability.

EXAMPLE 20

With a gasoline having an initial boiling point of 92° F. and a final boiling point of 410° F. are blended 2 grams of lead per gallon as tetraphenyllead, 6 grams of nickel as dimethylcyclopentadienyl nickel nitrosyl, 1 theory (based on the lead) of bromine as ethylene dibromide and 0.01 weight per cent (based on the gasoline) of di-[3-tert-butyl-5-(α-methylbenzyl)-4-hydroxyphenyl] docosyl phosphate. The finished fuel has very good storage stability.

This invention also extends to the use in the above fuel compositions containing manganese pentacarbonyl i.e., dimanganese decacarbonyl).

The compounds of this invention are also very effective antioxidants for high molecular weight unsaturated hydrocarbon polymers, such as polybutadiene (including poly-cis-butadiene), methyl rubber, polybutene rubber, natural rubber, butyl rubber, SBR rubber, GR-N rubber, piperylene rubber, dimethyl butadiene rubber, and the like. Another part of this invention is the method of preserving rubber which comprises incorporating therein a compound of this invention as defined above. The stabilizer is incorporated into the rubber by milling, Banbury mixing, or similar process, or is emulsified and the emulsions are added to the rubber latex before coagulation.

As used in the description and claims, the term "rubber" is employed in a generic sense to define a high molecular weight plastic material which possesses high extensibility under load coupled with the property of forcibly retracting to approximately its original size and shape after the load is removed. It is preferable that the rubber be a sulfur-vulcanizable rubber, such as India rubber, reclaimed rubber, balata, gutta percha, rubbery conjugated diene polymers and copolymers exemplified by the butadiene-styrene (SBR) and butadiene-acrylonitrile (GR-N or Paracril) rubbers, and the like, although the invention is applicable to the stabilization of any rubbery high molecular weight organic material which is normally susceptible to deterioration in the presence of oxygen, air, or ozone. The nature of these rubbers is well known to those skilled in the art.

Among the definite advantages provided by this invention is that the present rubber compositions possess unusually great resistance against oxidative deterioration. Moreover, these compositions exhibit excellent non-staining and non-discoloration characteristics. Furthermore, the novel stabilizer is relatively inexpensive and easily prepared, and possesses the highly beneficial property of low volatility. As is well known, a highly desirable feature of a rubber antioxidant is that it have a low volatility so that it remains admixed with the rubber during vulcanization and related process steps.

The rubber compositions of the present invention are illustrated by the following specific examples wherein all parts and percentages are by weight.

EXAMPLE 21

To illustrate the enhanced oxygen resistance of the rubber compositions of this invention and their excellent non-staining and non-discoloration characteristics, a light-colored stock is selected for test. This stock had the following composition:

|  | Parts by weight |
|---|---|
| pale crepe rubber | 100.00 |
| zinc oxide filler | 50.00 |
| titanium dioxide | 25.00 |
| stearic acid | 2.00 |
| ultramarine blue | 0.12 |
| sulfur | 3.00 |
| mercaptobenzothiazole | 1.00 |
| Total | 181.12 |

To the above base formula is added one part by weight of 3-isopropyl-5-(α-methyl-2,3-benzobenzyl)-4-hydroxyphenyl ditetracontyl phosphate, and the resultant blend cured for 30 minutes at 274° C. The resulting rubber has improved stability.

EXAMPLE 22

To a synthetic rubber master batch comprising 100 parts of styrene-butadiene rubber having an average molecular weight of 60,000, 50 parts of mixed zinc propionate-stearate, 50 parts of carbon black, 5 parts of road tar, 2 parts of sulfur and 1.5 parts of mercaptobenzothiazole is incorporated 1.5 parts of 3,5-di(α-methyl-4-sec-dodecylbenzyl)-4-hydroxyphenyl di-n-cetyl thionophosphate. This batch is then cured for 60 minutes at 45 psi of steam pressure.

EXAMPLE 23

Natural rubber stock is compounded according to the following formula:

| | Parts |
|---|---|
| thick gristly crepe natural rubber | 100.0 |
| wax | 2.0 |
| ultramarine dye | 0.1 |
| zinc oxide | 70.0 |
| titanium dioxide | 20.0 |
| sulfur | 3.0 |
| stearic acid | 1.2 |
| 3-methyl-5-(1-methylcyclohexyl)-4-hydroxyphenyl di-tetracontyl phosphate | 1.0 |
| benzothiazyl disulfide | 0.4 |
| amine activator | 0.5 |

This stock is then vulcanized for 60 minutes at 280° F.

EXAMPLE 24

A butadiene-acrylonitrile copolymer is produced from butadiene-1,3 and 32 per cent of acrylonitrile. Two per cent (based on the dry weight of the copolymer) of 2-methyl-5-tert-butyl-4-hydroxyphenyl di-n-octadecyl phosphate is added as an emulsion in a sodium oleate solution to the latex obtained from emulsion copolymerization of the monomers. The latex is coagulated with a pure grade of aluminum sulfate and the coagulum, after washing, is dried for 20 hours at 70° C.

Each of the above illustrated rubber compositions of this invention possesses greatly improved resistance against oxidative deterioration as compared with the corresponding rubber compositions which are devoid of an antioxidant. The methods of formulating the improved rubber compositions of this invention will now be clearly apparent to those skilled in the art.

Other rubbers and elastomers which can be prepared according to this invention are the rubbery polymerizations of isoprene, butadiene-1,3 piperylene; also the rubbery copolymer of conjugated dienes with one or more polymerizable mono-olefinic compounds which have the capability of forming rubbery copolymers with butadiene-1,3, outstanding examples of such monoolefinic compounds being those having the group

exemplified by styrene. Examples of such monoolefins are styrene, vinyl naphthalene, alpha methyl styrene, p-chlorostyrene, dichlorostyrene, acrylic acid, methyl acrylate, methyl methacrylate, methacrylonitrile, methacrylamide, methyl vinyl ether, methyl vinyl ketone, vinylidine chloride, vinyl carbazole, vinyl pyridines, alkyl-substituted vinyl pyridines, etc. In fact, excellent stabilization is achieved by incorporating a compound of this invention in any of the well-known elastomers which are normally susceptible to deterioration in the presence of air, such as elastoprenes, elastolenes, elastothiomers, and elastoplastics.

The compounds of this invention are especially effective antioxidants when added to polymers and copolymers of olefinically unsaturated monomers. For example, polyolefins are stabilized by the additives of this invention. As will be later shown, the additives are most useful in polypropylene. The following examples illustrate various embodiments of this aspect of the invention.

EXAMPLE 25

To a master batch of high molecular weight polyethylene having an average molecular weight of about 1,000,000, a tensile strength of 6,700 psi, a Shore D hardness of 74 and a softening temperature under low load of 150° C., is added 5 per cent of di-(3,5-di-tert-amyl-4-hydroxyphenyl) methyl phosphite to prepare a composition of outstanding oxidative stability.

EXAMPLE 26

A Ziegler polypropylene having a high degree of crystallinity, up to 93 per cent, is compounded with 0.005 per cent of S-(3,5-di-sec-eicosyl-4-hydroxyphenyl) O,O-di-n-hexacosyl thiolophosphate, and the resulting product has better stability characteristics.

In order to demonstrate the improved stabilization furnished by the antioxidant compounds of this invention, Oven Aging Tests were conducted on polypropylene. These tests are recognized in the plastic industry as a useful guide in determining oxidative stability. In these tests, small specimens of polypropylene are prepared containing the test stabilizer. These test specimens are placed in an air circulating oven maintained at 150° C. Five replicates are made of each polypropylene-stabilizer composition and the test criteria is the time in hours until three of the five replicates show signs of deterioration. Deterioration is evidenced by cracking, discoloration or any visual appearance of change in the specimen.

Test specimens were prepared by mixing the test stabilizers with polypropylene powder for 3 minutes in a Waring Blender. The mixture was then molded in a 6 inches × 6 inches sheet having a thickness of 25 mils. This was accomplished in a molding press at 400° F., under 5,000 psi pressure. Each sheet was then cut into ½-inch by 1-inch test specimens in order to obtain the five replicate samples. These samples were then subjected to the Oven Aging Tests.

In one series of tests, the additive compounds of this invention were incorporated into polypropylene samples and compared not only with the unstabilized polypropylene, but with polypropylene stabilized with an equal amount of other recognized antioxidants. The results obtained in these tests are shown in the following table.

TABLE 5

| NO. | ADDITIVE | Conc. (Wt. %) | Hours to Failure |
|---|---|---|---|
| 1. | None | — | 2.5 |
| 2. | 2,6-di-tert-butyl-4-methylphenol | 0.3 | 16.0 |
| 3. | 2,2'-methylenebis-(4-methyl-6-tert-butylphenol) | 0.3 | 112.0 |
| 4. | 4,4'-thiobis(2-tert-butyl-5-methylphenol | 0.3 | 96.0 |
| 5. | bis-(3,5-di-tert-butyl-4-hydroxyphenyl) n-octadecyl phosphate | 0.3 | 1408 |

As the above results show, the additive compounds of this invention (Test 5) provide about a 50-fold increase in polypropylene life over the unprotected polypropylene and a 12.5-fold increase over the protection afforded by some prior art antioxidant compounds.

The effectiveness of the present antioxidants is synergistically increased by using them in combination with a dialkylthiodialkanoate. These synergists are represented by the formula:

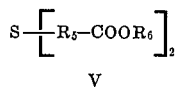

V wherein $R_5$ is a lower aliphatic hydrocarbon divalent radical containing from 1–4 carbon atoms and $R_6$ is an aliphatic hydrocarbon radical containing from about 6–50 carbon atoms.

Some examples of these synergists are:
dieicosyl thiodiacetate
didodecyl thiodipropionate
dipentacontyl thiodibutyrate
ditriacontyl thio di-2-methyl propionate
dihexadecyl thio-di-2,2-di-methyl propionate
dihexyl thio di-3-ethyl propionate
dioctyl thio di-2,2-dimethyl propionate Of the foregoing, the most preferred synergist is dilaurylthiodipropionate.

The synergists are used in an amount sufficient to promote a synergistic response with the antioxidant additive. The amount of antioxidant and synergist can be varied to produce the desired degree of protection at the least cost. The proper concentration is readily determined experimentally. In general, from about 0.001 to 3 weight per cent of the synergist in combination with from about 0.001 to 5 weight per cent of the antioxidant will give satisfactory results. A better concentration range is from about 0.05 to 1 weight per cent of the synergist in combination with from 0.1 to 3 weight per cent of the antioxidant.

Although the synergist combinations are beneficially employed in organic material normally subject to oxidative degradation, they are most useful in polymers and copolymers of ethylenically unsaturated monomers. For example, they greatly increase the useful life of polyolefins such as polyethylene, polypropylene, polybutadiene, ethylene-propylene copolymer, ethylene-propylene diene terpolymer, and the like.

Further Oven Aging Tests were conducted to show the effect of the synergistic compounds on the antioxidant compounds of this invention. These tests were carried out in polypropylene in the same manner as those described above.

TABLE 6

| NO. | ADDITIVE | Conc. (wt. %) | Hours to Failure |
|---|---|---|---|
| 1. | dilaurylthiodipropionate | 0.3 | 288 |
| 2. | bis-(3,5-di-tert-butyl-4-hydroxyphenyl) n-octadecyl phosphate | 0.3 | 1408 |
| 3. | bis-(3,5-di-tert-butyl-4-hydroxyphenyl) n-octadecyl phosphate dilaurylthiodipropionate | 0.1 0.2 | 1504 |

As the above results show, although 0.3 weight per cent of dilaurylthiodipropionate stabilized polypropylene for only 288 hours, the combination of only 0.2 weight per cent dilaurylthiodipropionate with only 0.1 weight per cent bis-(3,5-di-tert-butyl-4-hydroxyphenyl) n-octadecyl phosphate gave a polypropylene composition having more stability than the same polypropylene containing 0.3 weight per cent or three times as much bis-(3,5-di-tert-butyl-4-hydroxyphenyl) n-octadecyl phosphate. This degree of protection could only result from a synergistic interaction.

We claim:

1. A compound useful as an antioxidant for organic material normally tending to undergo oxidative degradation in the presence of oxygen, said compound having the formula:

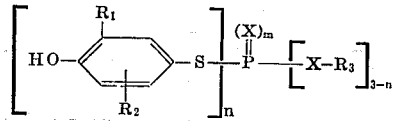

wherein m is an integer selected from 0 and 1, n is an integer selected from 1 and 2, $R_1$ is selected from the group consisting of alpha-branched alkyl radicals containing 3–20 carbon atoms, alpha-branched aralkyl radicals containing 8–20 carbon atoms and cyclohexyl and cyclooctyl radicals; $R_2$ is selected from the group consisting of alkyl radicals containing 1–20 carbon atoms, aralkyl radicals containing 7–20 carbon atoms and cyclohexyl and cyclooctyl radicals; $R_3$ is an alkyl radical containing 1–50 carbon atoms and X is independently selected from oxygen and sulfur.

2. A compound of claim 1 wherein X is oxygen.

3. A compound of claim 2 wherein $R_3$ is an alkyl radical containing 12–50 carbon atoms.

4. A compound of claim 1; namely, S-[2-methyl-5-(α-methylbenzyl)-4-hydroxyphenyl]-di-n-octadecyl thiolophosphate.

5. A compound of claim 1 having the formula:

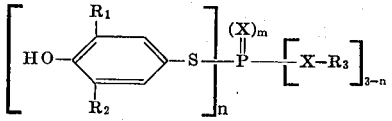

wherein $m$, $n$, $R_1$, $R_2$, $R_3$ and X are the same as in claim 1.

6. A compound of claim 5; namely, S-(3,5-di-sec-octyl-4-hydroxyphenyl)-O,O-di-n-octadecyl thiolothionophosphate.

7. A compound of claim 5; namely, S-[3-(α,α-dimethylbenzyl)-5-methyl-4-hydroxyphenyl]-O,O-di-n-octadecyl thiolophosphate.

8. A compound of claim 5; namely, 3,5-di-tertbutyl-4-hydroxyphenyl-di-n-eicosyl trithiophosphite.

9. A compound of claim 5; namely, S-[3,5-di-(α-methylbenzyl)-4-hydroxyphenyl]-O,O-di-triacontyl thiophosphite.

10. A compound of claim 5; namely, S-(3,5-diisopropyl-4-hydroxyphenyl)-O,O-di-n-dodecyl thiolothionophosphate.

11. A compound of claim 5 wherein X IS OXYGEN.

12. A compound of claim 11 wherein $R_1$ and $R_2$ are tert-butyl radicals.

* * * * *